United States Patent [19]
Crisafulli

[11] 3,951,810
[45] *Apr. 20, 1976

[54] OIL SKIMMER MODULE WITH FREE FLOATING WEIR TROUGH

[76] Inventor: Angelo J. Crisafulli, Box 1051, Glendive, Mont. 59330

[*] Notice: The portion of the term of this patent subsequent to July 9, 1991, has been disclaimed.

[22] Filed: June 27, 1974

[21] Appl. No.: 483,905

Related U.S. Application Data

[60] Division of Ser. No. 330,079, Feb. 6, 1973, Pat. No. 3,822,789, which is a continuation-in-part of Ser. No. 142,282, May 11, 1971, Pat. No. 3,756,414.

[52] U.S. Cl. .................. 210/242 S; 210/DIG. 25
[51] Int. Cl.² ............................................ E02B 15/04
[58] Field of Search ............... 210/83, 242, DIG. 21

[56] References Cited
UNITED STATES PATENTS

| | | | |
|---|---|---|---|
| 3,637,080 | 1/1972 | Markel | 210/242 |
| 3,703,463 | 11/1972 | Bhuta et al. | 210/DIG. 21 |
| 3,730,346 | 5/1973 | Plewitt | 210/DIG. 21 |
| 3,752,317 | 8/1973 | Lithen | 210/DIG. 21 |
| 3,785,496 | 1/1974 | Smith, Jr. | 210/DIG. 21 |
| 3,815,751 | 6/1974 | Pavlovic | 210/DIG. 21 |
| 3,822,789 | 7/1974 | Crisafulli | 210/242 |

Primary Examiner—Theodore A. Granger
Attorney, Agent, or Firm—Clarence A. O'Brien; Harvey B. Jacobson

[57] ABSTRACT

A skimmer for removal of a layer of oil or other floating pollutants from the surface of a body of water incorporating a sump box having a pump disposed therein for conveying material from the sump box into a floating barge, vessel or other area. A free floating weir forming means is disposed forwardly of the sump box and connected and communicated therewith in such a manner that the weir forming means may vary in elevational relation to the sump box without the sump box being elevationally varied in relation to the surface of the water. The weir forming means is supported by float means which orients the weir of the weir forming means in desired relationship to the surface of the water.

7 Claims, 7 Drawing Figures

OIL SKIMMER MODULE WITH FREE FLOATING WEIR TROUGH

CROSS-REFERENCE TO RELATED APPLICATION

This application is a division of my copending application Ser. No. 330,079, filed Feb. 6, 1973, now Pat. No. 3,822,789, issued July 9, 1974, for Oil Skimmer Module With Free Floating Weir Trough, which was a continuation-in-part of copending application Ser. No. 142,282, filed May 11, 1971, now Pat. No. 3,756,414, issued Sept. 4, 1973.

BACKGROUND OF THE INVENTION

1. Field of the Invention

The present invention generally relates to skimming devices for removing pollutants such as oil and other floating pollutants, from the surface of a body of water and incorporates a sump box or collecting receptacle mounted forwardly of a floating barge, vessel or in the path of flow of water, a pump associated therewith and a weir oriented in predetermined relation to the surface of the water and communicated with the sump box so that oil or other floating pollutants from the surface of the water will be collected in the sump box or receptacle and pumped to a desired location.

2. Description of the Prior Art

Accidental spillage, discharge of oil and other floating pollutants into bodies of water is a well known problem and many efforts have been made to remove such pollutants in order to restore the quality of the water to desired characteristics. Included in such attempts have been the use of chemical additives to cause a change in the characteristics of the oil, the use of confining devices to form barriers to prevent the spread of oil with pump devices associated therewith for removing the oil from the surface of the water, the use of various materials to absorb the oil from the water and many other endeavors to separate oil or other floating pollutants from the surface of water all of which have worked to some degree.

SUMMARY OF THE INVENTION

An object of the present invention is to provide a skimmer by which floating pollutants such as oil along with a thin layer of water can be collected into a sump box or receptacle and then pumped to a storage tank or the like to enable separation of the pollutants and the water after which the water may be returned to the body of water.

Another object of the invention is to provide a skimmer in which the sump box is provided with an opening therein below the water level to enable gravity flow of water and floating pollutants into the sump box.

A further object of the invention is to provide a skimmer in accordance with the preceding objects together with a weir forming device communicated with the opening in the sump box to control the quantity of water and pollutants discharged into the sump box with the weir forming means including a weir that is maintained at a desired elevational relationship to the surface of the body of water for controlling the inflow of water and pollutants into the sump box.

Still another object of the invention is to provide a skimmer in which the weir forming device includes a weir defined by an edge or edges of float supported members that can move in relation to the sump box to maintain a predetermined relationship to the surface of the body of water with the weir defining device also including flexible communication means between the sump box and the weir forming device to facilitate conveyance of the water and pollutants into the sump box.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a plan view of the skimmer of the present invention illustrating the association of the sump box, pump and weir forming device together with their relationship to the barge, vessel or the like.

DESCRIPTION OF THE PREFERRED EMBODIMENTS

Figure 1:
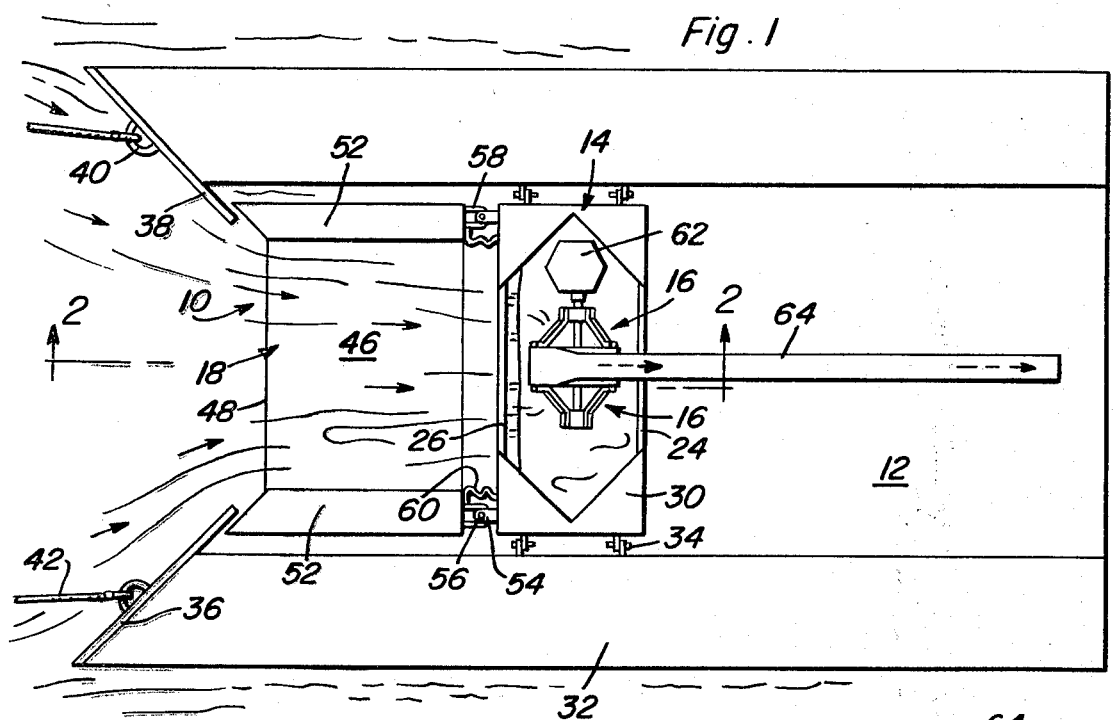
Figure 2:
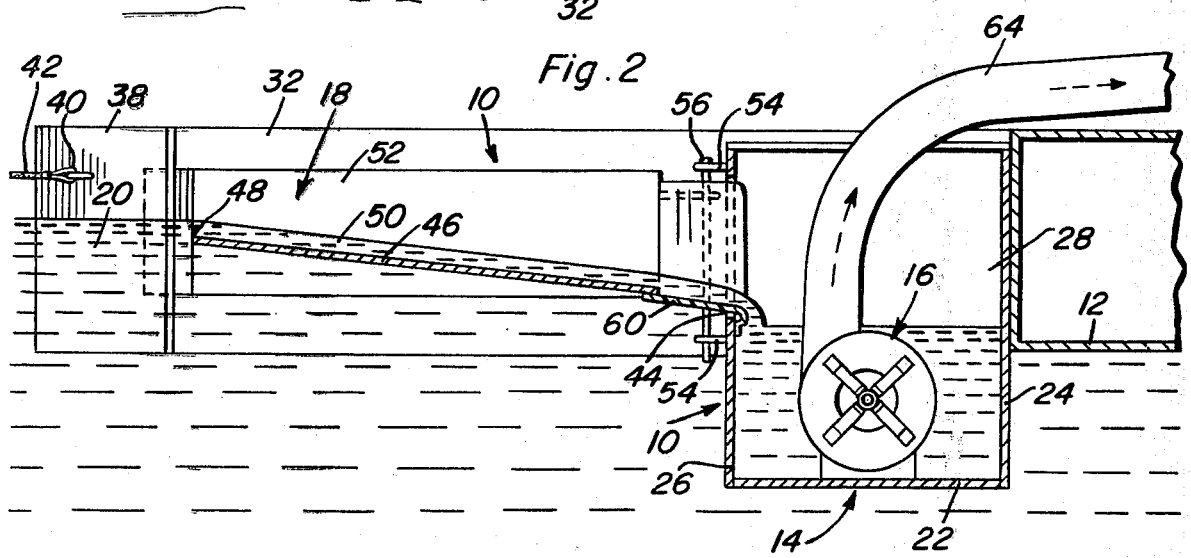
FIG. 2 is a longitudinal, vertical sectional view taken substantially upon a plane passing along section line 2—2 of FIG. 1 illustrating further structural details of the embodiment of the invention illustrated in FIG. 1.

Referring now specifically to the drawings, particularly FIGS. 1 and 2, the skimmer of the present invention is generally designated by reference numeral 10 and is adapted to be mounted in front of a floating barge 12 or other vessel by any suitable means. The skimmer 10 includes a sump box or collecting receptacle generally designated by the numeral 14 having a pump 16 associated therewith and a weir forming means 18 associated therewith and located forwardly thereof for receiving and collecting oil pollutants or other floating pollutants from the surface of a body of water 20 such as a lake, river, pond, ocean or any other body of water and discharging the pollutants and a quantity of water into the sump box.

The sump box or collecting receptacle 14 includes a bottom wall 22, a rear wall 24, a front wall 26, end walls 28 and a partial top wall 30 all of which cooperate to define a generally rectangular shaped hollow box or receptacle. The specific configuration and dimensional characteristics of the sump box may be varied as may the shape and configuration of the top wall 30 with the open area in the top wall 30 providing access to the interior of the sump box 14 to enable access to the pump and also to enable the sump box to be cleaned if desired. The sump box 14 is supported from and between forwardly extending side members 32 which may be in the form of pontoons, extensions on the barge 12, log booms or the like which extend forwardly of the barge, vessel or the like and are substantially parallel to each other with the connection between the sump box 14 and the pontoons 32 being interconnected lugs 34 or the like which secure the sump box 14 in position but enable removal thereof when desired. The forward ends of the pontoons 32 may be slanted as at 36 and provided with baffle plates 38 which extend inwardly beyond the inner edges of the pontoons 32. Also, loops 40 may be provided on the forward ends of the pontoons 32 for connection with a cable 42 or the like which may be connected to a towing vessel or the like.

The front wall 26 of the sump box 14 is provided with an inlet opening 44 which extends horizontally and vertically in the front wall 26 with the opening being located vertically in relation to the sump box 14 so that the lower edge of 44 is below the water level in order to assure gravity inflow of water into the sump box 14. The relationship of the water level to the inlet opening 44 is representatively illustrated in FIG. 2 but this relationship may vary depending upon the flotation characteristics of the barge or vessel 12 and the pontoons 32 and is not critical except that the lower edge of the opening 44 must be below the water level of the body of water 20.

The weir forming device 18 includes a substantially flat plate or pan 46 having a transversely extending forward edge 48 which defines and forms a weir over which a predetermined depth of water and pollutants will pass generally in the form of a layer designated by numeral 50 with the thickness of the layer 50 being determined by the elevational position of the forward edge 48 or weir 48 in relation to the surface of the body of water 20. The side edges of the plate 46 are connected with floats 52 which extend longitudinally from end to end of the plate 46 and which extend vertically above the plate 46 to define an entrance channel for the layer of water and pollutants 50.

The rear edge of the weir forming device 18 is connected with the front wall 26 of the sump box 24 by a pair of forwardly extending lugs 54 at each end portion of the front wall 26 receiving vertically extending anchor pins 56 which extend down through an elongated loop anchor or lug 58 secured to the rear end of the floats 52 as illustrated in FIG. 1 so that the floats 52 may maintain the plate 46 at a desired elevational position in relation to the surface of the body of the water independently of changes in elevational position of the sump box 14 while at the same time generally be retained in alignment with the opening 44 inasmuch as the anchor pins 56 will enable vertical movement and some limited degree of relative pivotal movement between the weir forming device 18 and the sump box 14.

For communicating the rear of the entrance channel defined by the plate 46 and the floats 52 with the inlet opening 44 of the sump box 14, a flexible connecting member 60 is provided which includes a bottom panel and two side panels with the top being open or closed as desired. The flexible member 60 may be of a waterproof and oil-proof fabric, plastic or other type of material having the forward and rear edges thereof secured to or bonded to the plate 46 and floats 52 in any suitable manner and also secured interiorly of the periphery of the opening 44 in the wall 26 in any suitable manner with the length of the flexible connecting member 60 being sufficient to enable the weir forming device 18 to move freely within the limits of the mechanical connection between the weir forming device 18 and the sump box 14 thereby maintaining gravity flow communication between the plate or pan 46 and the interior of the sump box 14 with the floats 52 maintaining a predetermined elevational relationship between the weir 48 and the surface of the body of water 20 independent of elevational changes of the sump box 14 with respect to the body of water.

The pump 16 is a centrifugal pump such as that illustrated in prior Pat. No. 3,371,614 issued Mar. 5, 1968, the disclosure of which is incorporated herein by reference thereto in which the pump casing is provided with dual inlets and provided with strut-like supports for the drive shaft bearings and drive shaft having the dual impeller mounted thereon. The pump is driven by a suitable motor such as a hydraulic drive motor 62 or the like and is provided with a discharge conduit 64 which extends to a storage tank or other storage area. The structure of the pump and the drive motor together with the hydraulic hoses, pump and power source for the hydraulic fluid is not shown and may be mounted in any suitable location on the barge or other vessel. Operation of the pump is such that the level of the liquid in the sump box 14 will be maintained below the opening 44 with the capacity of the pump being greater than the inlet capacity of opening 44 and weir 48 so that gravity flow into sump box 14 of the layer of water and pollutants 50 above plate 48 is maintained.

Figure 3:
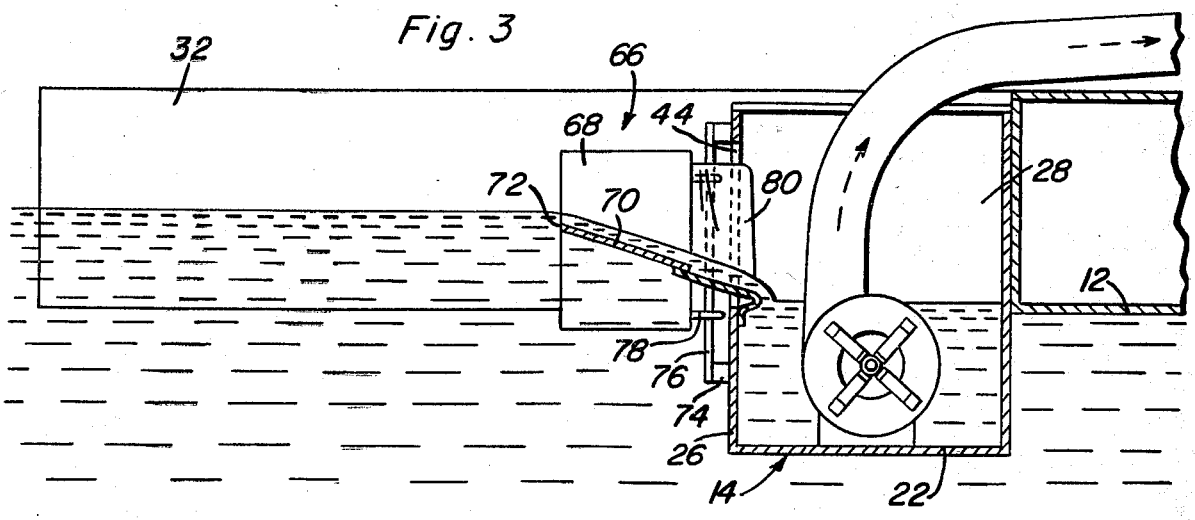
FIG. 3 is a longitudinal, vertical sectional view similar to FIG. 2 but illustrating a modified form of weir forming device associated with the sump box.

FIG. 3 illustrates a variation in the structure of FIGS. 1 and 2 in which the weir forming device 66 functions in substantially the same manner as the weir forming device 18 in FIGS. 1 and 2 except that the floats 68 and the transverse plate or pan 70 are relatively short insofar as longitudinal dimensions are concerned with the weir or edge 72 terminating in flush relation with substantially transverse straight forward ends of the floats 68 rather than at the rear edges of the forwardly slanted floats 52 in FIG. 1. In this form of the invention, the opening 44 in the front wall 26 of the sump box 14 is the same as that illustrated in FIGS. 1 and 2 and is provided with a slightly different mounting bracket structure 74 that has a rigid vertically extending rod 76 connected thereto at each side of the opening 44 for slidably and detachably receiving lugs 78 on the rear edges of the floats 68. A flexible member 80 interconnects the rear edge of the plate 40 and the front wall 26 of the sump box and extends upwardly along the side edges of the floats 68 and the opening 44 to provide gravity communication for flow of a layer of liquid and floating pollutants into the sump box 14. Other than in the dimensional characteristics of the weir forming device and a difference in the mechanical connecting means between the weir forming device and the sump box, the remainder of the structure in FIG. 3 is the same as in FIGS. 1 and 2 and the same reference numerals are applied to the common structural details.

Figure 4:
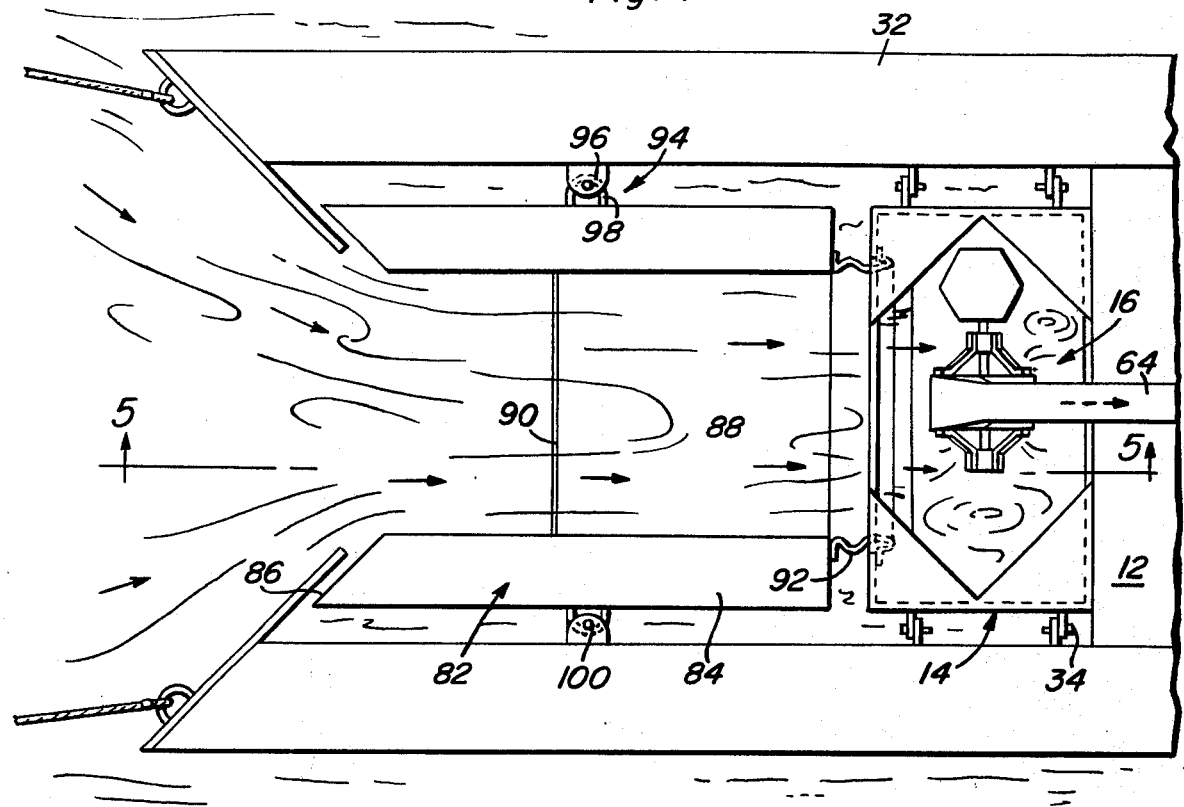
FIG. 4 is a plan view of another embodiment of the invention illustrating a different type of weir forming device and different communication with the sump box.
Figure 5:
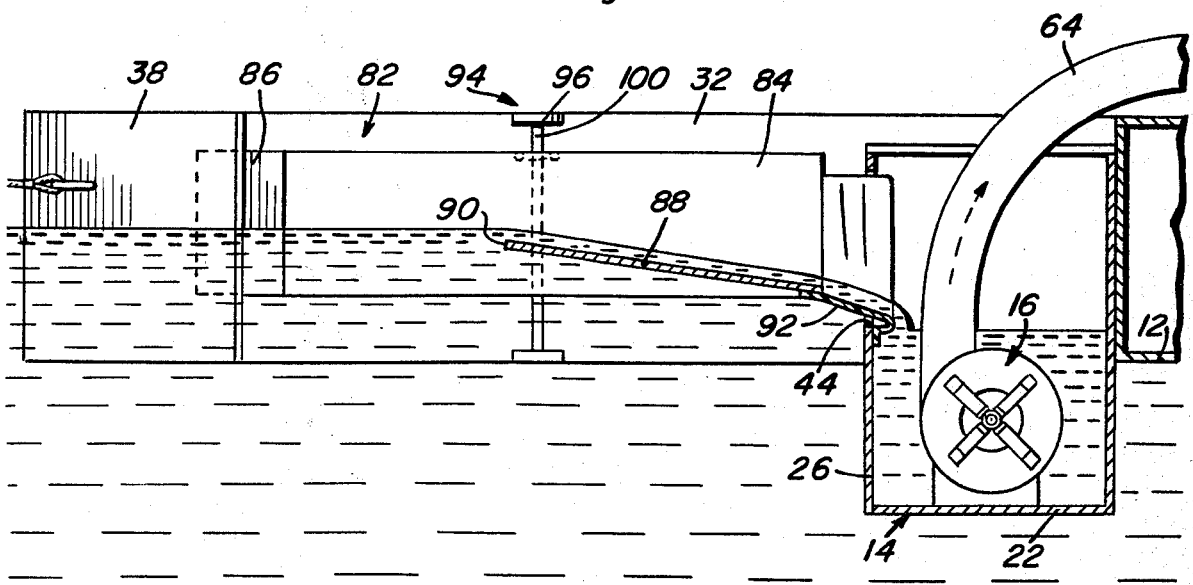
FIG. 5 is a longitudinal, vertical sectional view taken substantially upon a plane passing along section line 5—5 of FIG. 4 illustrating further structural details of this embodiment of the invention.

FIGS. 4 and 5 of the drawings illustrate another embodiment of the invention in which the sump box, barge and pontoon relationship are all the same and with the relationship of the weir forming device to the sump box also being the same. In this embodiment of the invention, the weir forming device is generally designated by reference numeral 82 and includes a pair of floats 84 having a beveled or slanted forward edge 86 located immediately behind the inner edges of the baffle plates on the pontoons 32 which is the same relationship as illustrated in FIG. 1. However, in this construction, the plate 88 has a forward edge or weir 90 located intermediate the length of the floats 84 as illustrated in the drawings. The rear edge of the weir forming device 82 is communicated with the opening 44 in the front wall 26 of the sump box 14 by a flexible connecting member 92 substantially identical to the connecting member 60 but in this embodiment of the invention, the weir forming device 82 is not mechanically connected with the sump box 14 but rather is mechanically connected to the pontoons 32 by connecting means generally designated by reference numeral 94.

The connecting means 94 is in the form of a pair of vertically spaced lugs 96 on the pontoons 32 aligned with a loop or lug 98 on each of the floats 84 with each lug 98 being vertically spaced from lugs 96 to enable vertical movement of the weir forming device 82 and also a limited amount of lateral and pivotal movement. For connecting the lugs in vertical alignment with the loop, a vertical rod or anchor pin 100 extends vertically through lugs 96 and is anchored thereto in any suitable manner and also the pin 100 extends loosely through lug 98. Thus, the floats 84 and the weir 90 are free to move within certain limits with respect to the sump box with the flexible member 92 maintaining communication between the weir forming device and the sump box so that a layer of water and pollutants will flow by gravity into the sump box to be pumped from the bottom portion or collecting portion of the sump box into a storage tank or storage area by the pump device 16.

Figure 6:
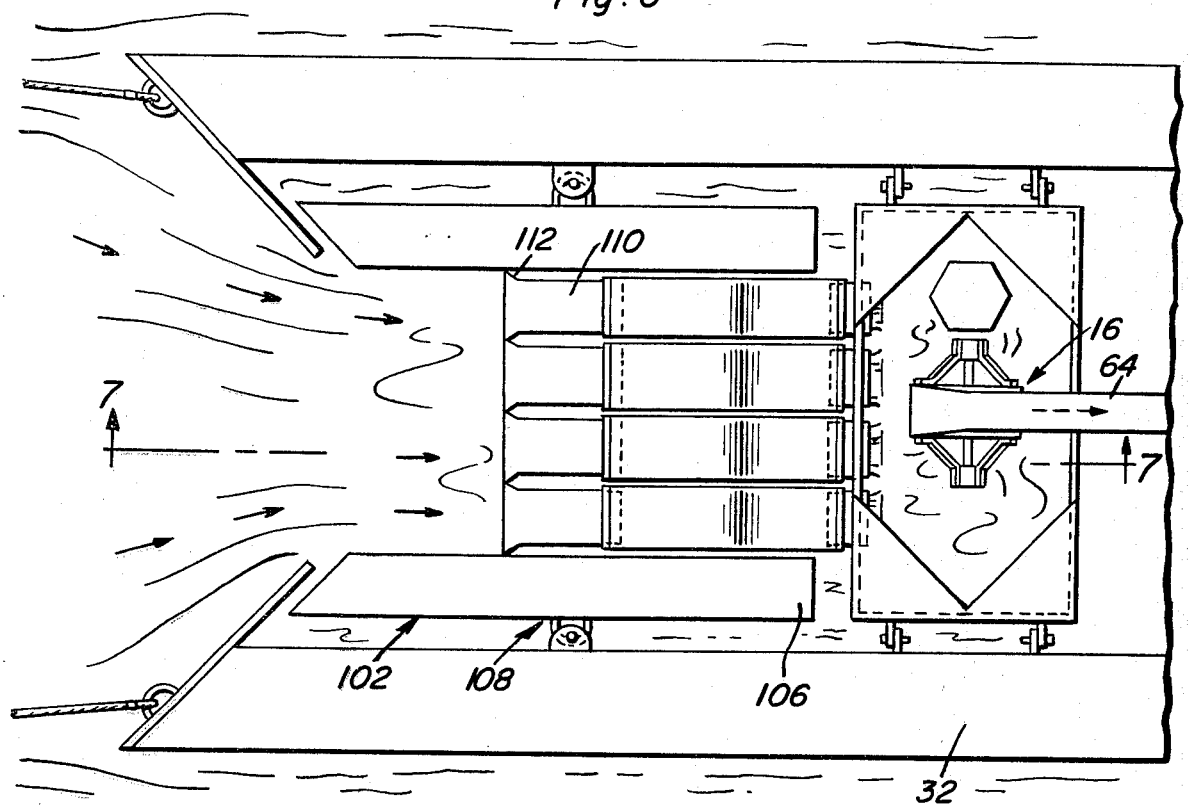
FIG. 6 is a plan view similar to FIG. 4 but illustrating another embodiment of weir forming device incorporating a plurality of tubular members each of which is connected with the sump box through a flexible tube.
Figure 7:
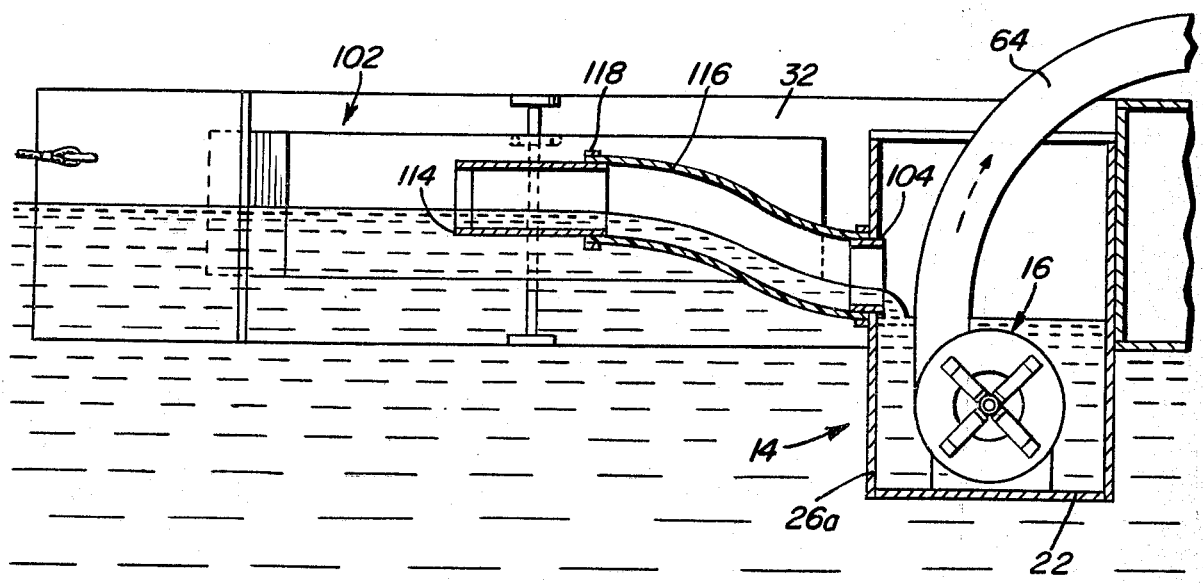
FIG. 7 is a longitudinal, sectional view taken substantially upon a plane passing along section line 7—7 of FIG. 6 illustrating further structural details of this embodiment of the invention.

FIGS. 6 and 7 illustrate another embodiment of the weir forming device generally designated by reference numeral 102 associated with the sump box or collecting receptacle 14 which has a front wall 26a that is slightly different from the front wall of the sump box illustrated in the other embodiments of the invention with the front wall 26a including a plurality of relatively short pipe or conduit members 104 extending therethrough and rigid therewith to form a plurality of gravity inlet openings for gravity flow of water and pollutants into the sump box. As illustrated, the short pipes 104 project forwardly a short distance from the front wall 26a.

The weir forming device 102 includes a pair of floats 106 vertically movably connected to the pontoons 32 by connecting means 108 which is the same as the connecting means 94 in FIGS. 4 and 5. Attached to and disposed substantially horizontally between the floats 106 is a plurality of rigid tubular members or conduits 110 each of which has an outwardly flared entrance end 112 in which the entrance ends are flared only in a horizontal direction but not in a vertical direction thereby defining, in effect, a continuous weir or forward edge 114. Thus, the channel between the floats 106 is defined by the plurality of tubular members 110 each of which may be square, rectangular, circular or any other shape or configuration. The entire area between the floats 106 is occupied by the flared ends of the tubular members 110 with the forwardly flared ends 112 being rigidly fixed together by any suitable means such as welding or the like and also rigidly fixed to the floats 106 in any suitable manner such as by welding or the like. The portion of the tubular members 110 rearwardly of the outwardly flared forward ends 112 are slightly spaced from each other and are slightly spaced from the floats 106 as illustrated in FIG. 6 thereby providing a plurality of rearwardly opening tubular members free of each other with the tubular members 110 generally being aligned with the short pipe sections or nipples 104 welded into the front wall 26a of the sump box 14.

Extending between and connected with each of the tubular members 110 and pipe sections 104 is a flexible conduit 116 having the ends thereof fixedly secured to the tubular member 110 and the pipe section 104 respectively by a suitable clamp mechanism 118 which fixes the ends of the flexible tubular conduit 116 in position. The length of the tubular conduit 116 is slightly greater than the longitudinal distance between the tubular member 110 and the corresponding pipe section 104 to enable vertical shifting of the tubular members 110 along with the floats 106 so that the weir forming device 102 may move vertically within certain limits in relation to the sump box 14. As illustrated, the pipe sections 104 are disposed below the normal floating position of the floats 106 so that a layer of water and pollutants of predetermined thickness may flow by gravity from the weir 114 through the tubular members 110, conduits 116, pipe sections 104 into the sump box 14. The pollutants and water collected in the sump box 14 will be pumped therefrom by the pump 16 through the discharge pipe 64 to a suitable storage tank or storage area. Also, in this embodiment of the invention, the weir 114 is located rearwardly of the forward ends of the floats 106 so that the floats serve as a guide for confining the material forwardly of the weir 114 with the separate tubular members 110 providing independent flow paths to generally reduce turbulence of the water and pollutants as they enter the sump box.

In each embodiment of the invention, the flotation characteristics of the floats may be varied by the use of selectively added or removed weights, ballast or the like thereby enabling the weir to be varied in relation to the surface of the water. In each embodiment, the weir forming device and the sump box are interconnected by a flexible structure including a flexible fabric, butyl rubber, plastic or other type of flexible connector.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

I claim:

1. In combination with a floating vessel, a skimmer including a receptacle at the forward end portion of the vessel, said receptacle including a bottom portion below water level and inlet means above the bottom portion and below water level for gravity inflow of water into the receptacle, pump means communicated with said bottom portion of the receptacle for removing material therefrom, float means disposed forwardly of the receptacle and guided for vertical elevational movement in relation to the receptacle, said float means including a pair of longitudinally extending parallel floats spaced laterally from each other, rigid weir forming means supported rigidly from said floats and communicated with said inlet means for the receptacle to guide a layer of water and any pollutants therein of predetermined constant thickness into the receptacle, said floats extending forwardly of the weir forming means for guiding water and any pollutants toward the weir forming means, said weir forming means being connected to said inlet means by flexible means enabling vertical elevational movement thereof with the floats and confining the layer of water and any pollutants passing from the weir forming means to the receptacle.

2. The combination of claim 1 wherein said weir forming means supported from said float means includes a plurality of longitudinally extending rigid tubular members having horizontal, aligned, adjacent lower entrance edge portions defining a substantially horizontal weir, said floats being connected with said tubular members and extending alongside the outermost tubular members for supporting the weir below water level and above the inlet means for the receptacle, said flexible means including a plurality of independent flexible conduits interconnecting the rear of the tubular members with the inlet means for the receptacle to convey the layer of water and pollutants into the receptacle by gravity flow, said inlet means including a plurality of independent pipe nipples extending forwardly from the receptacle.

3. The structure as defined in claim 2 wherein said flexible conduits are substantially the same size as the tubular members and pipe nipples and have a length slightly greater than the distance between the rear ends of the tubular members and the pipe nipples to permit elevational movement therebetween.

4. The combination of claim 1 wherein said weir forming means supported from said float means includes a plate, said float means including a pair of floats supporting the plate below water level and above the inlet means for the receptacle and extending along each side edge of the plate and above the top surface thereof to form a guide channel for the layer of water and pollutants, the forward edge of said plate forming a substantially horizontal weir, said flexible means being in the form of a flexible member interconnecting the rear edge of the plate and the floats with the inlet means for the receptacle to convey the layer of water and pollutants into the receptacle by gravity flow.

5. The structure as defined in claim 4 wherein said floating vessel includes a pair of forwardly extending members spaced horizontally from each other for receiving the receptacle therebetween, said floats being disposed substantially parallel to said forwardly extending members, the forward ends of said forwardly extending members including rearwardly extending and inwardly extending baffles having inner edges overlapping the forward edges of the floats for guiding the material between the floats, the forward ends of the floats being correspondingly bevelled to form continuations of the baffle, said weir plate extending throughout the length of the floats, a vertical rod-like guide member attached to each side edge portion of the sump box, vertically spaced lugs on the rear of each of said floats slidably engaging the vertical member for guiding vertical movement of the floats while precluding fore-and-aft angular movement of the floats, said flexible member extending horizontally throughout the length of the rear edge of the plate and vertically upwardly between the rear edge of the floats and the opening in the sump box.

6. The structure as defined in claim 4 wherein said vessel includes a pair of forwardly extending members disposed in parallel, laterally spaced relation to each other with the float members being disposed adjacent the forwardly extending members, said weir plate extending from front-to-rear end of the floats and being rigidly affixed thereto, said floats and weir plate being relatively short as compared with the length of the forwardly extending members, said sump box including a vertical guide rod adjacent each edge thereof, each of said floats having a pair of rearwardly projecting members slidably engaging the guide rod thereby vertically guiding movement of the floats while preventing fore-and-aft angular movement of the floats and weir plate.

7. A skimmer adapted to be supported in a body of water having floating pollutants therein for removing the pollutants and an upper layer of water therewith, said skimmer comprising a sump box oriented with at least a portion thereof below the surface of the water, said sump box including an inlet opening at least partially disposed below the surface of the water defining a gravity inlet for water and pollutants, pump means communicated with the portion of the sump box below the surface of the water for removing water and pollutants collected therein and discharging them into a desired location for separation, a weir forming device disposed forwardly of the sump box, said weir forming device including float means and a longitudinal elongated weir supported thereby whereby the float means supports the weir in predetermined elevational relation to the surface of the body of water for removing a layer of water and pollutants of a predetermined thickness, means communicating with the weir with the inlet of the sump box to provide gravity flow from the weir into the sump box and enable vertical elevational movement of the weir independent of the sump box and maintaining the same angular relationship to the sump box, said weir forming device including a plurality of rigid tubular members having substantially continuous forward bottom edges defining a weir, said means communicating the weir with the sump box including a plurality of independent tubular conduits of flexible construction interconnecting the tubular members and the sump box, said sump box including a plurality of tubular nipples defining the inlet opening thereto with the tubular nipples extending a short distance forwardly of the sump box, the length of the flexible tubular conduits being greater than the horizontal distance between the tubular members defining the weir and the sump box to enable relative vertical movement between the sump box and weir forming device, said float means including a pair of parallel longitudinally extending floats rigidly connected with the rigid tubular members and extending forwardly and rearwardly thereof, the rearward ends of the floats being spaced forwardly of the sump box and independent thereof, means at the outer central portion of each float for guiding vertical movement thereof and precluding fore-and-aft angular movement of the floats and rigid tubular members.

* * * * *